United States Patent [19]
Ghaly

[11] Patent Number: 4,705,305
[45] Date of Patent: * Nov. 10, 1987

[54] COUPLING AND CLAMPING DEVICE

[76] Inventor: Azmy W. Ghaly, 1648 Timbertrail, Wheaton, Ill. 60187

[*] Notice: The portion of the term of this patent subsequent to Jan. 10, 2004 has been disclaimed.

[21] Appl. No.: 623,441

[22] Filed: Jun. 22, 1984

[51] Int. Cl.$^4$ .............................................. F16L 37/20
[52] U.S. Cl. .................................... 285/311; 285/373; 285/409; 24/270; 24/273
[58] Field of Search ............... 285/409, 373, 319, 311; 24/270, 273

[56] References Cited

U.S. PATENT DOCUMENTS

| | | | |
|---|---|---|---|
| 892,197 | 6/1908 | Umpleby et al. | 24/273 |
| 1,012,345 | 12/1911 | Ferguson | 24/270 |
| 2,846,244 | 8/1958 | Parker | 285/409 |

FOREIGN PATENT DOCUMENTS

| | | | |
|---|---|---|---|
| 189370 | 3/1957 | Austria | 24/270 |
| 625822 | 6/1963 | Belgium | 24/270 |
| 208977 | 1/1924 | United Kingdom | 24/270 |
| 845537 | 8/1960 | United Kingdom | 24/270 |

Primary Examiner—Richard J. Scanlan, Jr.

[57] ABSTRACT

The invention, of toggle principle to hold and join two tubes or shafts, has 3 main parts, which do not wear, have great strength which can be increased by increasing the width of its 3 parts, which can be attached together by adhesive and two flexible rubber strips. It can be dynamically balanced to connect rotating shafts. It can be self-adjustable when its band is corrugated spring steel. It has many advantages and is suitable for many more applications than conventional clamps. It is a universal clamp, simple, easy to manufacture, economical, and can be used over and over again. It is the answer for many applications, easy to operate by engaging the inwardly opening eye shaped end of a handle-lever in one outwardly opening eye shaped end of a band and in the meantime the handle-lever is pivotally engaged with one end of a third member which at its other end is pivotally engaged with the other outwardly opening eye shaped end of the band and then rotating the handle-lever toward the band to its final position, passing by the dead center of this toggle mechanism.

3 Claims, 12 Drawing Figures

COUPLING AND CLAMPING DEVICE

BACKGROUND OF THE INVENTION (1) Field of the Invention

This device relates to band clamps to clamp or couple, together, two tubes, pipes or shafts, end to end, using the principle of toggle lever, to draw the band tight over the tubes, pipes or shafts. This invention provides an improved tightening mechanism utilizing the toggle lever type and also satisfying the sanitation requirement in the food industry.

Connectors utilizing the toggle lever action together with toggle linkage connecting the terminals of a band clamp, have been utilized and proposed in many different forms. However, toggle connectors by their nature embody problems of manufacture and design. The present invention is relatively simple, easy to manufacture and inexpensive. It also satisfies the rigid sanitation requirements in today's strict regulation of sanitation in the pharmaceutical, food, and flour milling industries. Also it is the only clamp of toggle type that provides mechanically balanced quick coupling for rotating shafts, without the problem of vibration or resonance. In addition, this clamp has uniform force distributed along its total width, and this clamping force can easily be increased by using wider clamps. This feature also distinguishes this invention from all other clamps using the toggle action and broadens the field of application using this invention. The wider the clamp band the higher is the clamping force and the higher is the reliability.

Moreover, many of the other clamps of many different designs are not suitable in the food processing, especially in flour mills, because the flour and dust enter into the spaces between the clamp parts and infestation takes place, causing sanitary problems. This invention has a streamlined shape and less voids inside its parts. It is easy to clean by wiping or brushing. This invention is secured against sudden opening by a wing nut, which is another important merit for reliability and prevention of accidents due to the pipes or shafts becoming loose and hitting someone or causing damage.

This invention consists of simple pieces easy to manufacture in mass production and is inexpensive compared to other clamps. It does not rely on screws, bails or holes to wear. This clamp can be used over and over again.

Sometimes, in practice, in pneumatic conveying systems, the conveying tubes, at their meeting ends, are connected by welding, because conventional clamps are not strong and suitable. In the flour mills or grain elevators systems, welding is dangerous because of the grain dust, and in many cases explosions took place. This invention provides an alternative way to connect instead of welding especially when a rubber gasket and a strengthening sleeve are used with the clamp as in FIG. 1A and 3B, with modern adhesive applied to the inner surface of the rubber sleeve. This invention also eliminates the need to flange the ends of the two tubes and so eliminates the higher costs of flanging the end of the conveying tubes. This invention is the most economical clamping or coupling device in the modern technology.

(2) Descriptions of the Prior Arts

All conventional toggle type clamps are limited in width and rely in their linkages on bails, hooks, holes into which the link pivots. These linking methods are weak and so the strength of such clamps is limited. Also the conventional clamps of toggle type are not sanitary because they have big voids inside where food, flour particles, and dust accumulate and cause infestation problems. These conventional toggle type clamps are complicated and expensive to manufacture. It is worthy to mention that my invention is very economical, sanitary and with unlimited width and corrugated band, can not only connect tubes but also support the joint against deflection when the tubes are inclined to the vertical, eliminating other expensive supports for conveying lines.

British Pat. No. 845537 is of V shape suitable only to connect flanged tubes.

U.S. Pat. No. 2846244 is also of V shape suitable only to connect flanged tubes.

Belgian Pat. No. 625822 is also of V shape.

British Pat. No. 208977 is limited in width and uses holes for pivoting and its strength depends on its axis of rotation strength.

As mentioned before, all conventional toggle clamp types are limited in width, have weak links and parts wear quickly and are not sanitary. They are expensive to make and cannot be used over and over again when compared to my invention which covers wide applications economically.

SUMMARY

This invention makes use of the toggle action principle as a quick clamp or coupling to connect tubes or shafts end to end as used in pneumatic conveying tube systems. Also it can be quickly clamped and is suitable for maintenance and repair of tubes in an emergency. This invention has many advantanges such as:

(1) Its clamping force is proportional to its width and is uniformly distributed. This clamp can have any desired width to suit the application. All conventional toggle type clamps are limited in width and their strength is very limited, by relying in their linkages on bails, screws, hooks and holes for pivoting and supporting the clamping force. Also because of these weak linkages, conventional clamps wear quickly and are expensive to manufacture.

When a rubber sleeve and a strengthening split sleeve (usually made of steel) are used with said invention as shown in FIGS. 1A and 3B and with modern suitable adhesive applied to the inner surface of the rubber sleeve, the clamping is very reliable to be used to connect tubes of pneumatic conveying systems, eliminating the need to weld the tubes end to end and save costs and time and prevent the possibility of explosion.

(2) This invention (clamp) is simple and easy to manufacture from many materials at low price. It is economical.

(3) It is sanitary, streamline shaped with small voids, easy to clean and suitable for the food industry.

(4) This clamp, when its band is made into two identical halves as shown in FIG. 1A, provides a dynamically balanced coupling which does not induce vibration in the coupled rotating shafts. This innovation extends the useful application of said invention in power transmission concepts at economical cost.

(5) This clamp can be manufactured in all sizes from mini up to giants to suit many applications which require minimum space.

(6) This clamp has no wearing parts and so can be used over and over again to save costs.

(7) When the band portion, between its two rigid open eye ends, is made of spring material which has corrugations parallel to its axis as shown in FIG. 7, then this clamp has great advantage to distinguish it from all other conventional clamps, because in this case, this clamp will be self adjusting because as the clamp is tightened on tubes or shafts, these corrugations can stretch as a spring without reducing the clamping force. This spring action of the corrugations extends the range of the application of this clamp, as well as renders it suitable to accommodate automatically for tolerance differences in the clamped tubes or the parts of the clamp itself and also any size difference of the rubber sleeve due to aging. This inherent self adjustment feature, of the corrugated spring action of the clamp, makes this clamp more reliable than conventional clamps which need to be tightened from time to time to take care of aging of the rubber sleeve.

BEST MODES FOR CARRYING OUT THE INVENTION

Figure 1A:
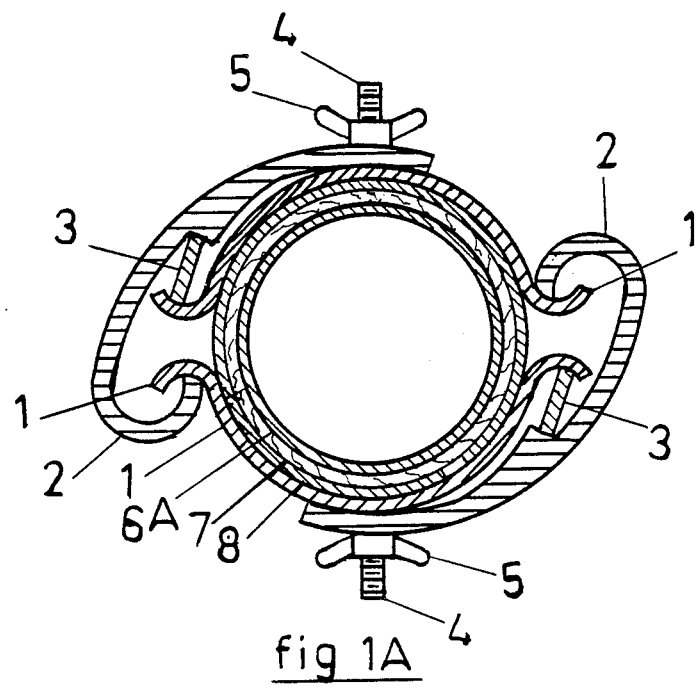
FIG. 1A is a section view in FIG. 1B, illustrating the clamping device in a version of two identical halves. Each half has 5 parts: Item 1 (the band), item 2 (the handle-lever), item 3 (the third member), item 4 (stud or screw fastened to item 1), and item 5 (a wing nut). Items 6B and 6A are the two tubes positioned end to end. Item 7 is a rubber sleeve and item 8 is an open strengthening sleeve usually made of metal with a sufficient gap between its open ends. All items 1, 2, and 3 have the same width.
Figure 1B:
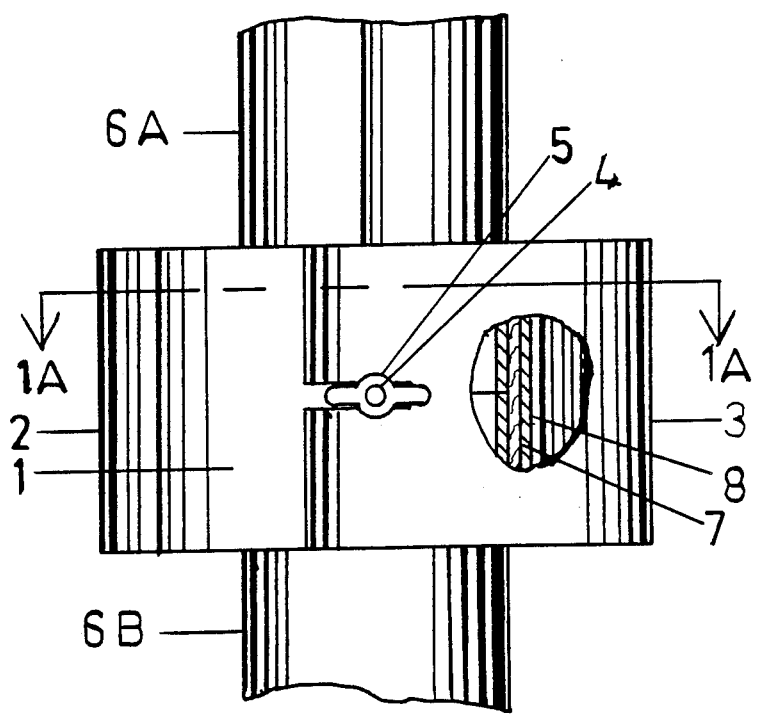
Figure 2A:
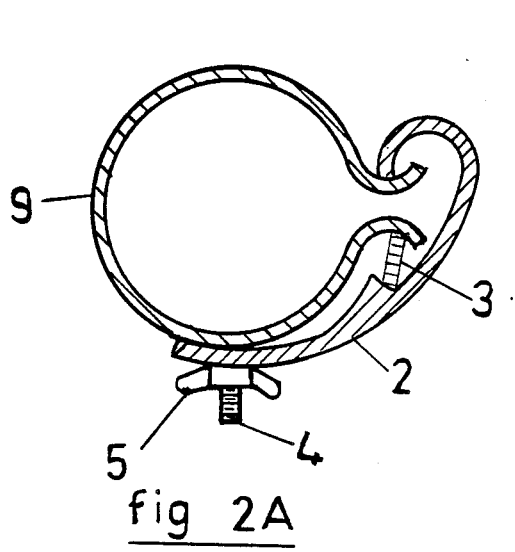
FIG. 2A is a sectional view in FIG. 2B and illustrates the clamp in its simplest form when instead of using 2 bands items 1 as in FIG. 1A, only band item 9 is used. Other items are the same as in FIG. 1A.
Figure 4:
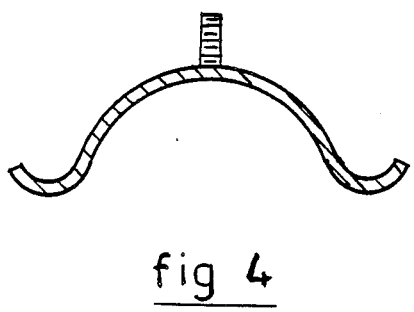
FIG. 4 is a profile section of item 1 FIG. 1A.
Figure 2B:
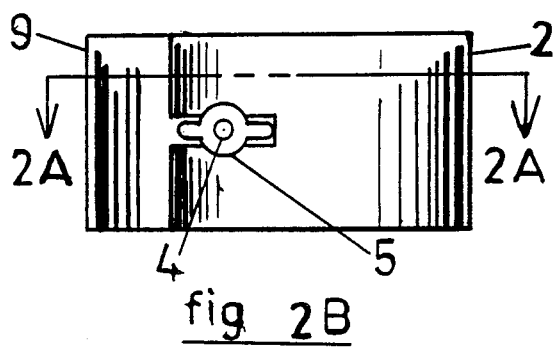
Figure 5:
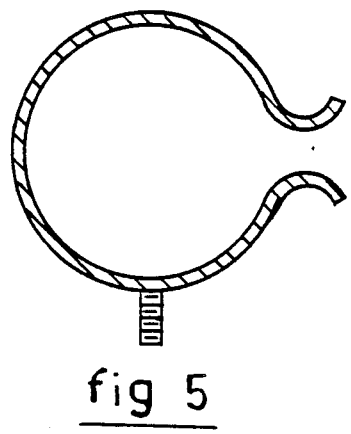
FIG. 5 is a profile section of item 9 FIG. 3B.
Figure 7:
FIG. 7 is a partial profile section in the band FIG. 4 or FIG. 5 when it is made of spring material corrugated in its protion between its rigid two open eye ends.
Figure 6:
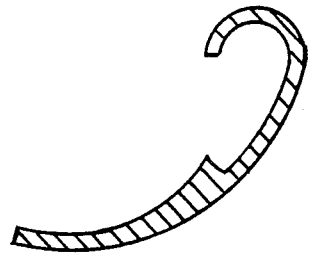
FIG. 6 is a profile section of item 2.
Figure 8:
FIG. 8 is a profile section of item 3.
Figure 3B:
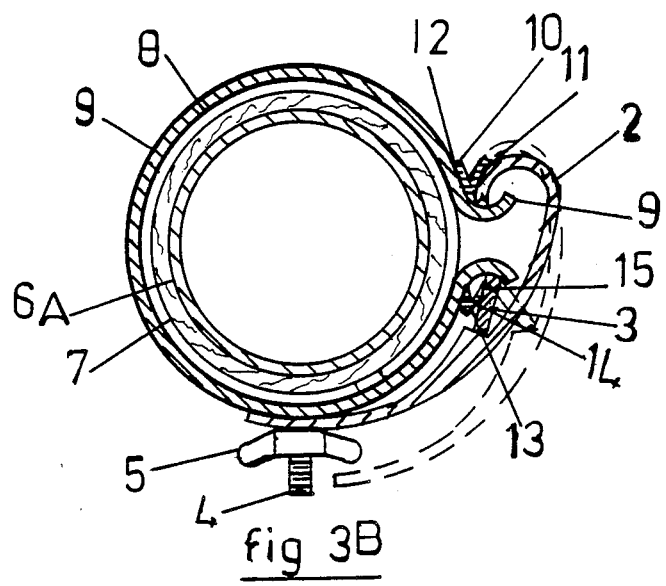
FIG. 3B is a section view in FIG. 3A and shows the clamp of FIG. 2A when applied to hold tubes 6A and 6B end to end. It also illustrates item 2 as it moves toward the clamp to its final position to tighten the clamp.

The first mode is shown in FIGS. 1A and 1B. The 2 tubes or shafts 6A and 6B are positioned end to end. A rubber sleeve, item 7, is mounted on the joint, then an open metal sleeve is put over the rubber sleeve. The parts of the clamp which consists of 2 identical sets of parts (items 1—the clamp, 2, and 3) are arranged over the metal split sleeve. The two handle-levers, item 2, are engaged with its two corresponding parts, item 1 and 3 (as illustrated in FIG. 3B for one handle-lever). These two handle-levers simultaneously are pushed and rotated to close in contact with its corresponding band, item 1. At this final position the corresponding stud or screw, item 4, is protruded into the slot of its corresponding handle-lever. The wing nut is used to secure the clamping against loosening or opening. This arrangement constitutes a coupling which is dynamically balanced and useful in power transmission applications.

The second mode is shown in FIG. 3B which is a clamp that has only one set of essential parts, items 9 (the band), 2 (the handle-lever) and 3 (the third member) and that also uses the rubber sleeve and the split metal strengthening sleeve. In addition, two pieces of rubber items 10 and 13 act as flexible hinges. Using adhesive one of said two pieces is attached to items 2 and 9 and the other piece is attached to items 9 and 3. This arrangement is quick, suitable to connect tubes which need to be disconnected quickly in case of emergency--as choking problems in pneumatic systems. Also when adhesive is used to fasten the rubber sleeve on the tubes, this arrangement constitutes an air tight clamping system as required in pneumatic pressure systems. It is also a device to patch holes in the tubes in an emergency. In these above mentioned peferred embodiments when the band part of the invention is substituted by one which has corrugations made of spring steel except its two rigid ends, then the clamping device will be self adjusted to accommodate for differences, of tolerance in the clamp parts, or due to aging of the rubber sleeve.

The width of the band, the handle-lever and the third member as well as the width of the rubber sleeve and the steel split sleeve are the same, and this width can be increased to increase the strength and the holding force of the clamp of this invention.

The three essential parts of the invention are:

(1) the band (item 1 as in FIG. 1A or item 9 as in FIG. 3B) has 2 ends—each end is formed into a rigid open eye.

Figure 3A:
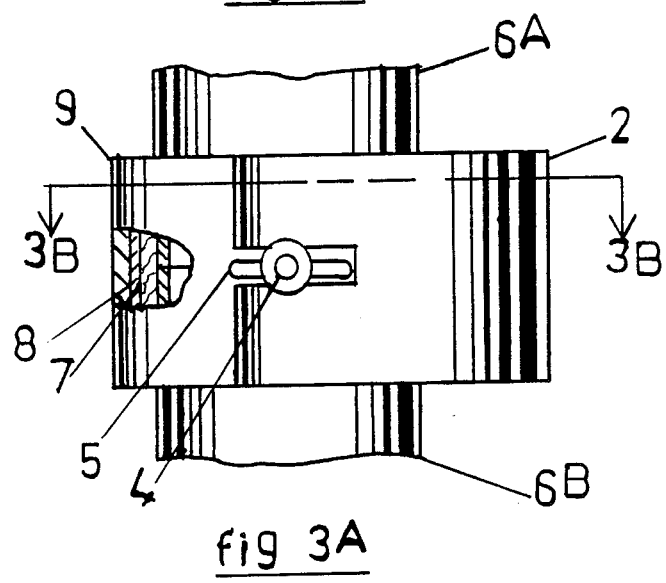
FIG. 3C is a partial view of FIG. 3B enlarged to show the rubber hinge pieces items 10 and 13 and how item 10 is attached to items 9 and 2 by adhesive items 12 and 11 respectively. Also shows item 13 is attached to items 9 and 3 by adhesive items 14 and 15 respectively.
Figure 3C:
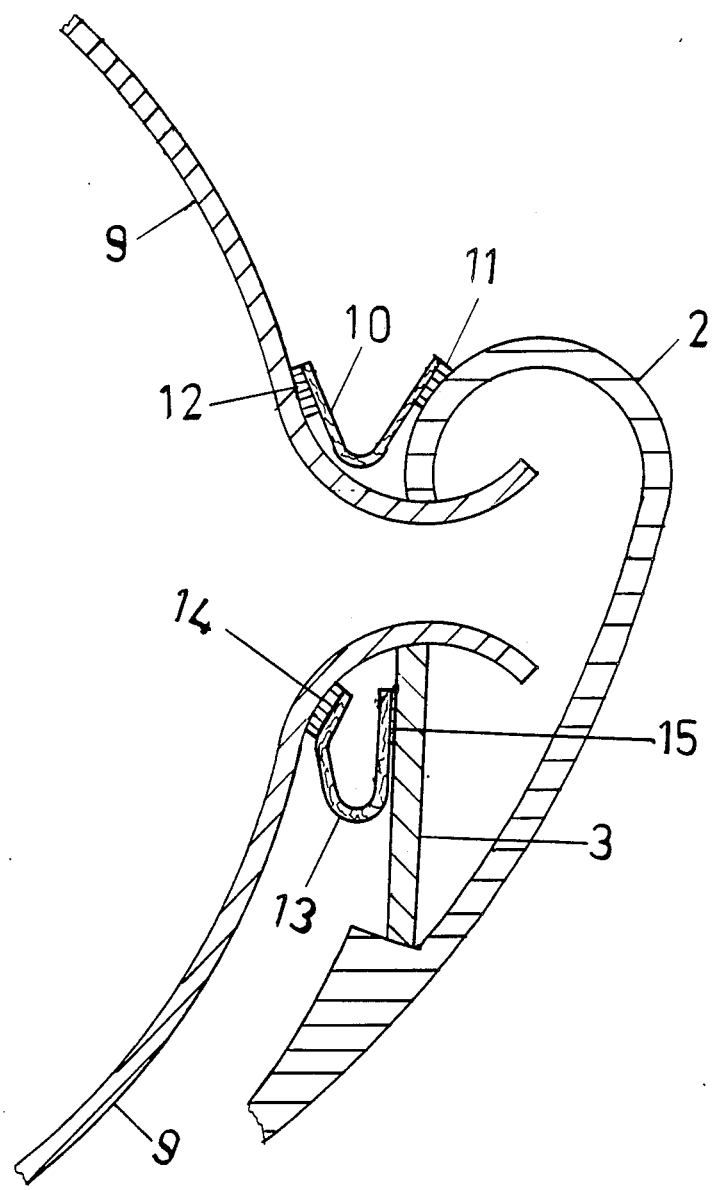

(2) the handle-lever (item 2 as in FIG. 1A or FIG. 3B) is made of rigid strong material and is formed so that one end has an open eye shape and at the other end a slot, as shown in FIGS. 3A and 1B; also this handle-lever has on its inner surface between its end a curved depression along the whole width of the handle-lever where item 3 (the third member) can pivot when the handle-lever is pushed to close.

(3) the third member (item 3 as in FIGS. 1A and 3B) is made of rigid strong material.

I claim:

1. A quick clamp or coupling with toggle action for tightening in the clamp to join objects such as tubes or shafts in axial alignment comprising:
   (a) a circular shaped band, cross-sectionally rectangular in width and having wo ends, each end formed into a rigid outwardly opening eye shape and said band having at its outer mid-portion an outwardly projecting weld stud or screw;
   (b) a curved handle-lever of rigid material having a curved depression across the width of the inside surface thereof, said handle-lever having a free end with a longitudinal slot and the other end formed into an inwardly opening eye pivotally engaging in one of the outwardly opening eye ends of said band; a flexible rubber hinge piece adhesively attached to said band and handle-levered engaged ends to hold them together and allow relative pivotal motion therebetween;
   (c) a third member of rigid material having two ends, one of its ends pivotally engaging in the other outwardly opening eye end of said band; a flexible rubber hinge piece adhesively attached to said band and third member engaged ends to hold them together and allow relative pivotal motion therebetween; the other end of said third member being pivotally engaged in said curved depression, so that when the handle lever is rotated towards and against the clamp, said third member urges the band ends together and tightens said clamp, the weld stud projects through said longitudinal slot and said handle-lever is secured by a wing nut on said stud thereby locking all parts of the clamp together.

2. A quick clamp or coupling with toggle action for tightening the clamp to join objects such as tubes or shafts in axial alignment comprising:
   (a) a band, said band comprising two identical circular band halves; each band half end formed into a rigid outwardly opening eye shape, each band half having at its outer mid-portion an outwardly projecting weld stud or screw;
   (b) two curved handle-levers of rigid material, each having a curved depression across the width of the inside surface thereof, each having a free end with a longitudinal slot and having the other end formed into an inwardly opening eye shape pivotally engaging in one of the outwardly opening eye ends of a band half;
   (c) two third members of rigid material, each having two ends, one end of each third member being pivotally engaged in the other outwardly opening eye of a band half, the other end of each third member being pivotally engaged in said curved depression of a respective handle-lever, so that when the two said handle-levers are simultaneously rotated toward and against the clamp, said third members urge the respective band halves together and tighten said clamp; each said weld stud projecting through a respective slot and a wing nut fastened to each stud to secure the handle-levers in place and constitute a dynamically balanced clamping device.

3. A quick clamp or coupling as defined in claims 1 or 2 wherein said band is made of spring material such as spring steel and has between its ends small corrugations parallel to the longitudinal axis of the clamp, so when the clamp is tightened by rotating its handle-lever toward the clamp and actuating said third member, the corrugated band can stretch tightly about the objects, tubes or shafts inside said band.

* * * * *